US009000328B2

(12) United States Patent
Helf et al.

(10) Patent No.: US 9,000,328 B2
(45) Date of Patent: *Apr. 7, 2015

(54) SERVICING ARRANGEMENT FOR A PORTABLE AIR COMPRESSOR/GENERATOR

(75) Inventors: Joseph N. Helf, Appleton, WI (US);
Nathan J. Jochman, Appleton, WI (US);
John P. Laitala, Appleton, WI (US);
John C. Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1132 days.

This patent is subject to a terminal disclaimer.

(21) Appl. No.: 11/742,208

(22) Filed: Apr. 30, 2007

(65) Prior Publication Data

US 2008/0264918 A1     Oct. 30, 2008

(51) Int. Cl.
  *B23K 9/10*      (2006.01)
  *F04C 23/00*     (2006.01)
  *B23K 9/32*      (2006.01)
  *F04C 29/02*     (2006.01)

(52) U.S. Cl.
  CPC . *F04C 23/00* (2013.01); *B23K 9/32* (2013.01); *F04C 29/02* (2013.01)

(58) Field of Classification Search
  USPC ........... 219/133, 134; 123/90.38, 195, 198, 123/559.1, 196; 417/211, 312, 410.1, 411, 417/415, 417
  See application file for complete search history.

(56) References Cited

U.S. PATENT DOCUMENTS

| | | | |
|---|---|---|---|
| 1,929,887 A * | 10/1933 | Gustafson | 417/27 |
| 3,858,686 A | 1/1975 | Luterick | |
| 4,403,466 A | 9/1983 | Tillotson et al. | |
| 5,277,554 A * | 1/1994 | Elson | 417/363 |
| 5,522,475 A * | 6/1996 | Thompson | 184/1.5 |
| 5,694,780 A * | 12/1997 | Alsenz | 62/117 |
| 5,713,318 A * | 2/1998 | Tausk et al. | 123/90.38 |
| 6,363,905 B1 | 4/2002 | Davis | |
| 6,471,488 B2 * | 10/2002 | Nolan | 417/63 |
| 6,753,503 B2 * | 6/2004 | Bankstahl et al. | 219/133 |
| 6,883,540 B2 * | 4/2005 | Bankstahl et al. | 137/594 |
| 6,989,509 B2 * | 1/2006 | Silvestro | 219/133 |
| 6,992,265 B2 | 1/2006 | Bender et al. | |
| 7,098,424 B2 * | 8/2006 | Silvestro | 219/133 |
| 2005/0155959 A1 * | 7/2005 | Bender et al. | 219/133 |
| 2006/0027547 A1 * | 2/2006 | Silvestro | 219/133 |

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A system, in one embodiment, may include an engine, a compressor coupled to the engine, and an oil fill assembly coupled to the compressor. The oil fill assembly relocates an oil fill location from a bottom region of the compressor to a top region of the compressor. A system, in other embodiments, may include a compressor retrofit kit. The kit may include a first tube configured to couple with a drain or an existing oil fill disposed in a base region of a compressor. The kit also may include a second tube coupled to the first tube, wherein the second tube is configured to couple with a vent in the compressor. The kit may include a relocated oil fill section coupled to the first tube, the second tube, or a combination thereof. A system having a compressor retrofit kit attached to the case of the compressor is also provided.

25 Claims, 7 Drawing Sheets

SERVICING ARRANGEMENT FOR A PORTABLE AIR COMPRESSOR/GENERATOR

BACKGROUND

The invention relates generally to welding systems and more particularly to welding systems utilizing an engine coupled to an air compressor and welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may also use compressed air to operate plasma cutters, air tools and the like. Typically, compressed air is provided via a standalone air supply. Thus, a welding operator may use, both, a standalone engine-driven welding generator and a standalone air supply. The independence of the two units may increase the amount of time and labor involved with setup, transportation, and so forth. In addition, the independence of the two units may result in an increased amount of maintenance and repair costs due to duplication of parts.

BRIEF DESCRIPTION

A system, in one embodiment, may include an engine, a compressor coupled to the engine, and an oil fill assembly coupled to the compressor. The oil fill assembly relocates an oil fill location from a bottom region of the compressor to a top region of the compressor. A system, in another embodiment, may include a compressor retrofit kit. The kit may include a first tube configured to couple with a drain or an existing oil fill disposed in a base region of a compressor. The kit also may include a second tube coupled to the first tube, wherein the second tube is configured to couple with a vent in the compressor. The kit may further include a relocated oil fill section coupled to the first tube, the second tube, or a combination thereof. In an alternative embodiment, a system may include a compressor retrofit kit that may include a tube configured to couple to a case of the compressor. The tube allows pressure to vent from the case of the compressor and relocates an oil fill location from a bottom region of the compressor to a top region of the compressor.

DRAWINGS

These and other features, aspects, and advantages of the present invention will become better understood when the following detailed description is read with reference to the accompanying drawings in which like characters represent like parts throughout the drawings, wherein.

Figure 1:
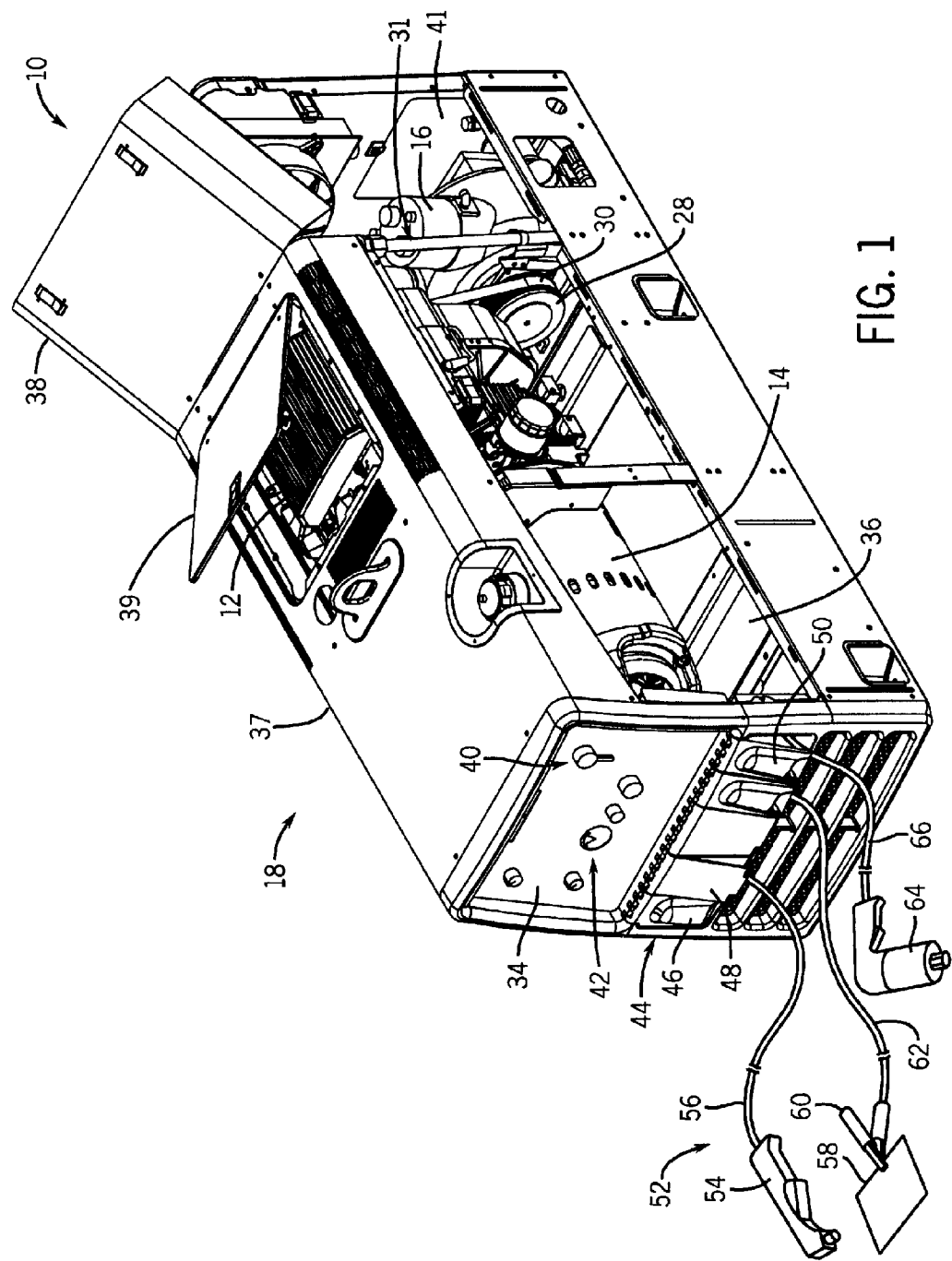
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
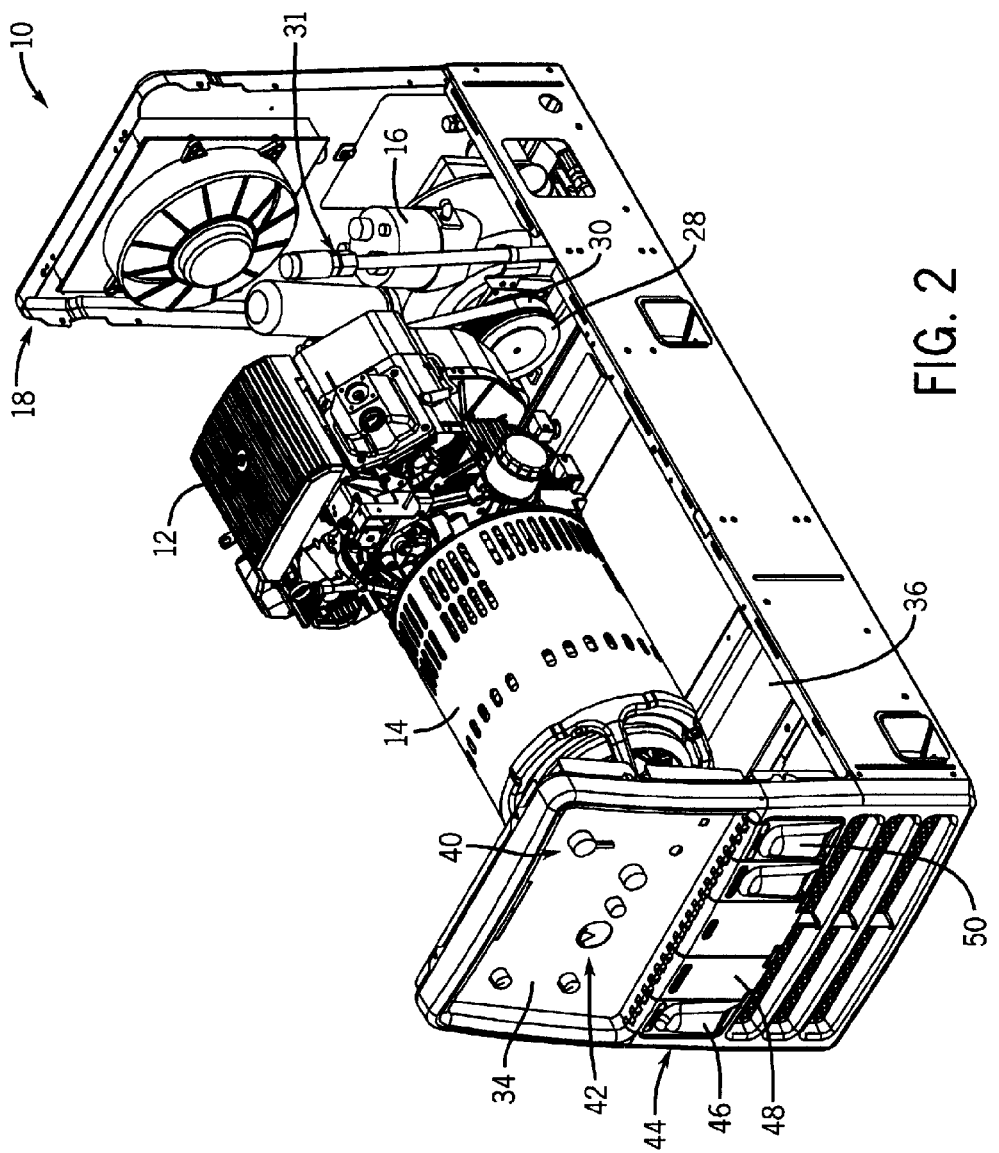
FIG. 2 is another partial perspective view of the welding generator/compressor system as illustrated in FIG. 1, wherein an entire top access panel assembly is removed to further illustrate various internal features in accordance with embodiments of the present invention.
Figure 3:
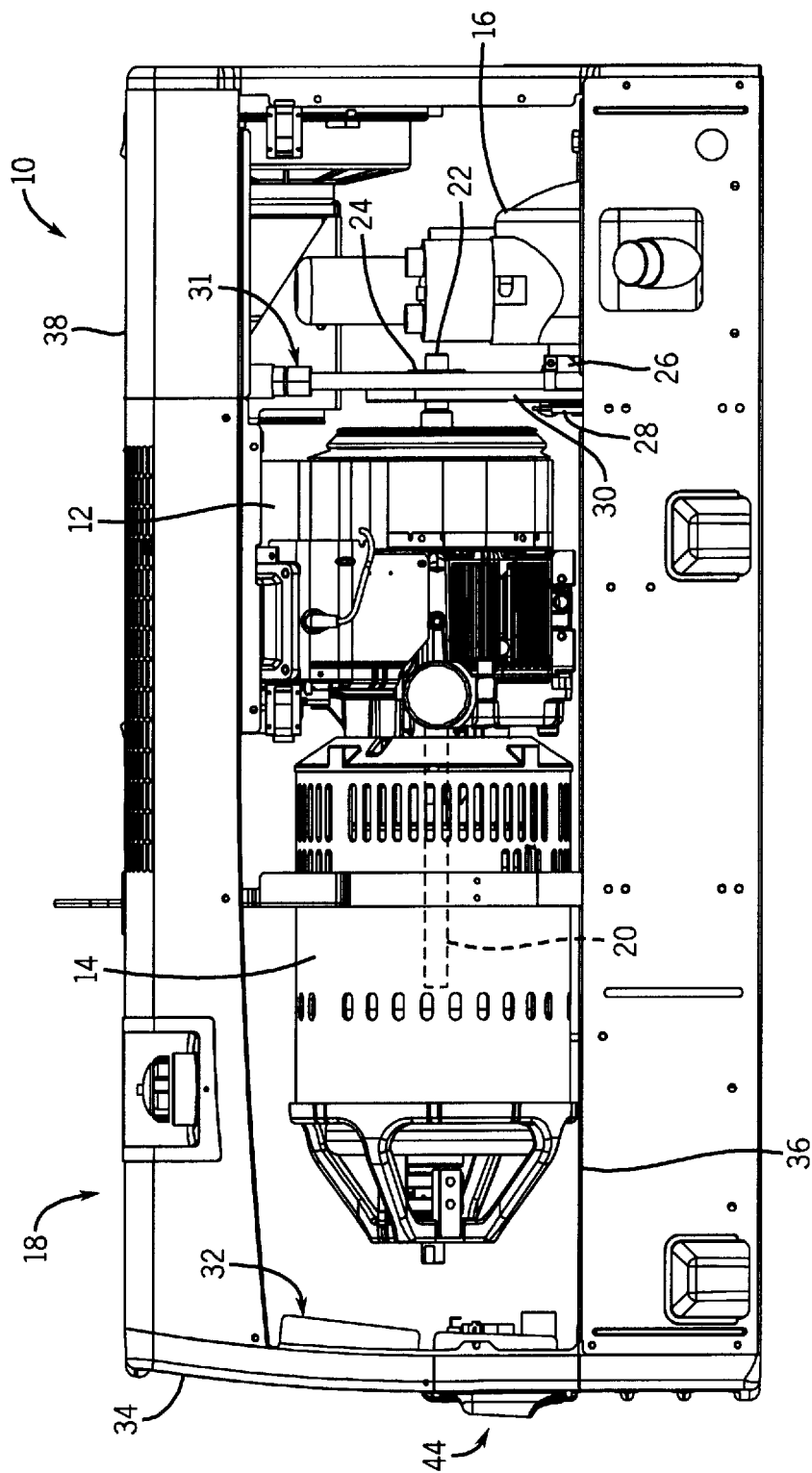
FIG. 3 is a side view of the welding generator/compressor system as illustrated in FIG. 1, wherein the two top access panels are rotated to closed positions and the side access panel is removed to further illustrate various internal features in accordance with embodiments of the present invention.
Figure 4:
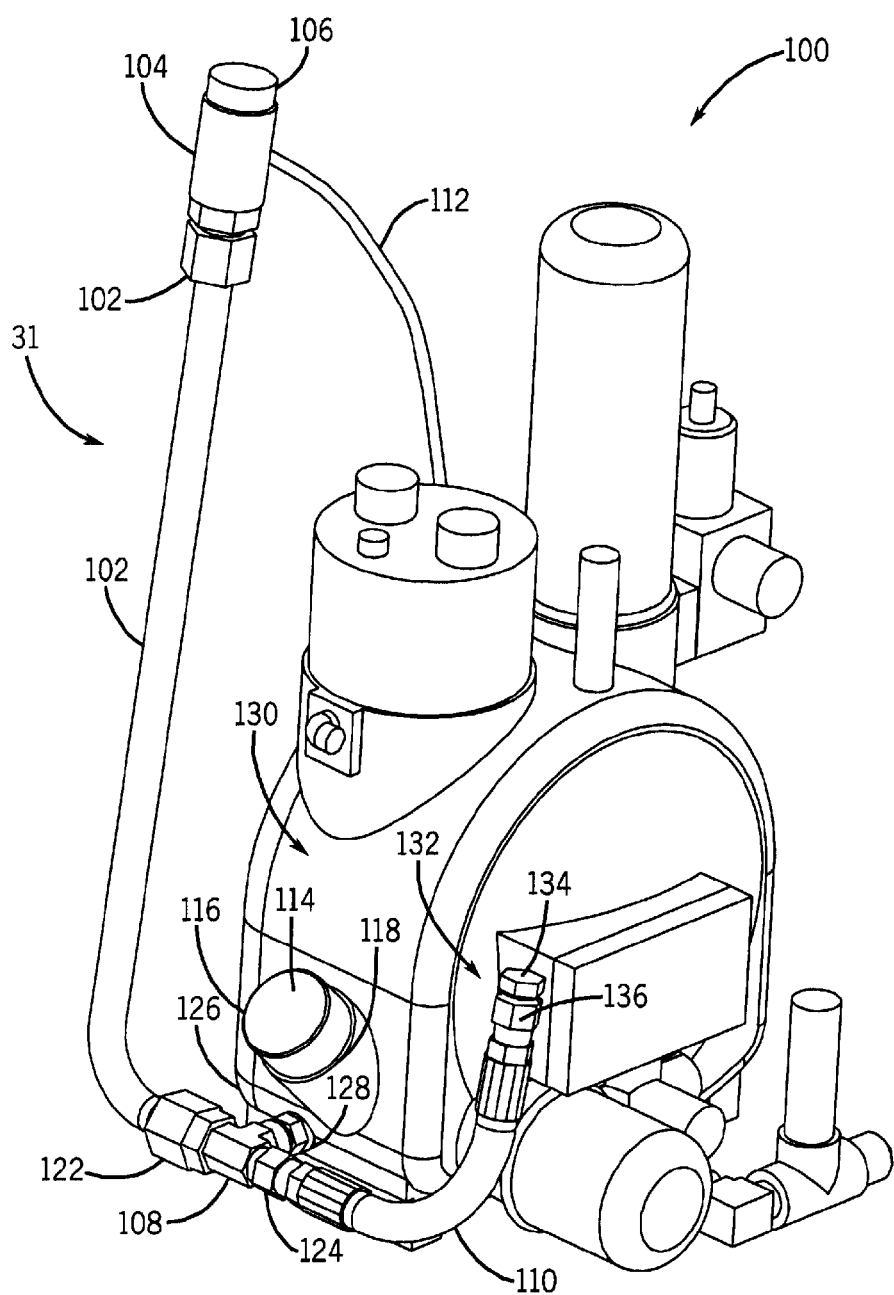
FIG. 4 is a perspective view of an embodiment of an oil fill assembly coupled to an air compressor of the welding generator/compressor system as illustrated in FIGS. 1-3.
Figure 5:
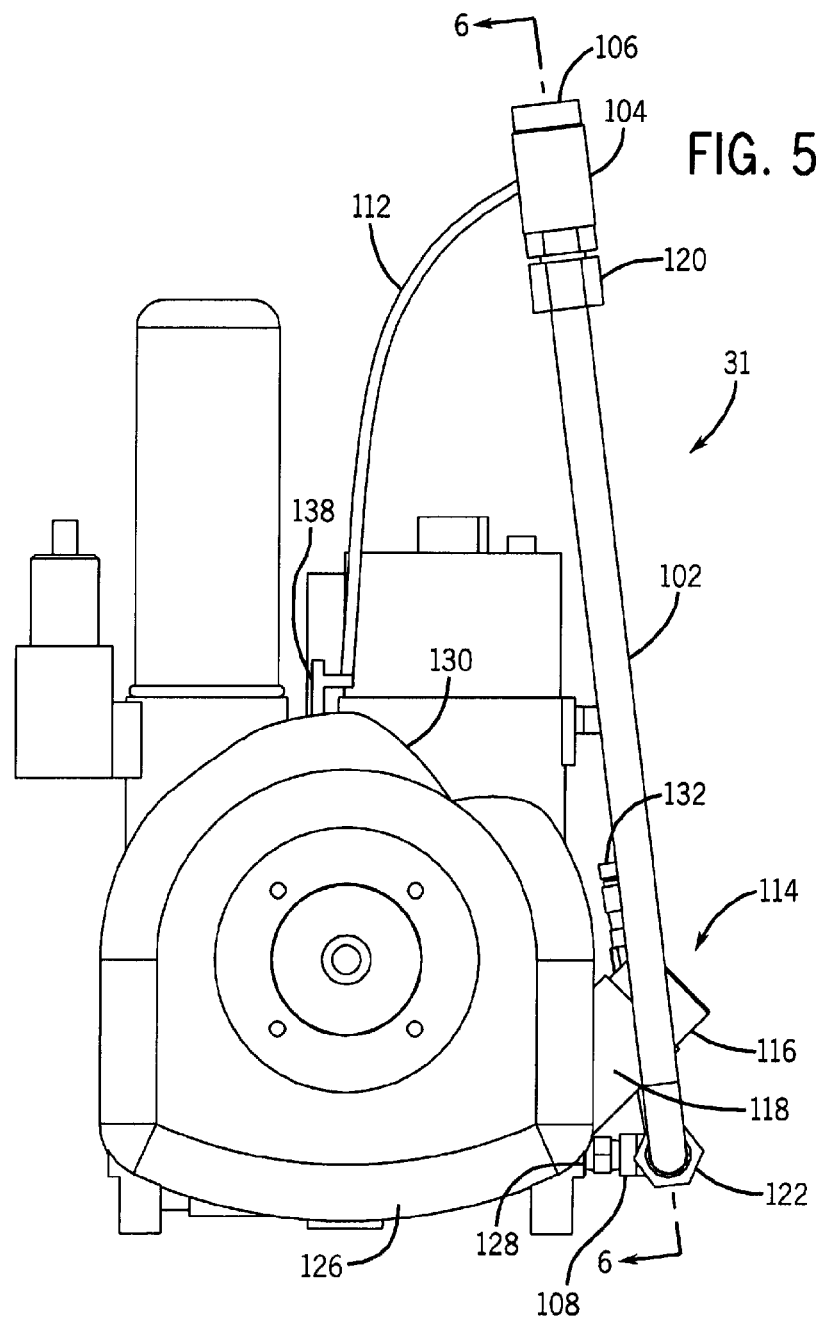
Figure 6:
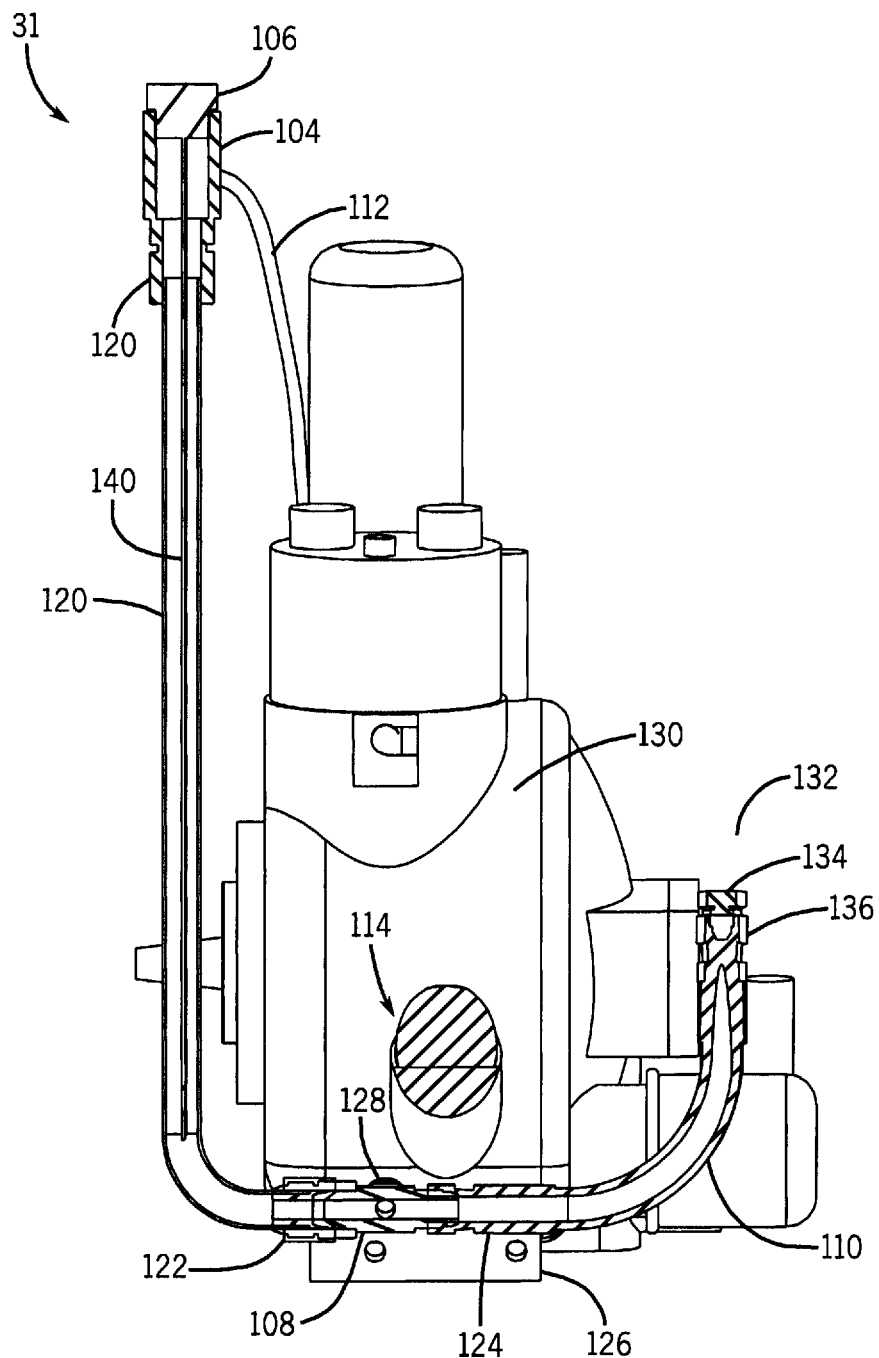
Figure 7:
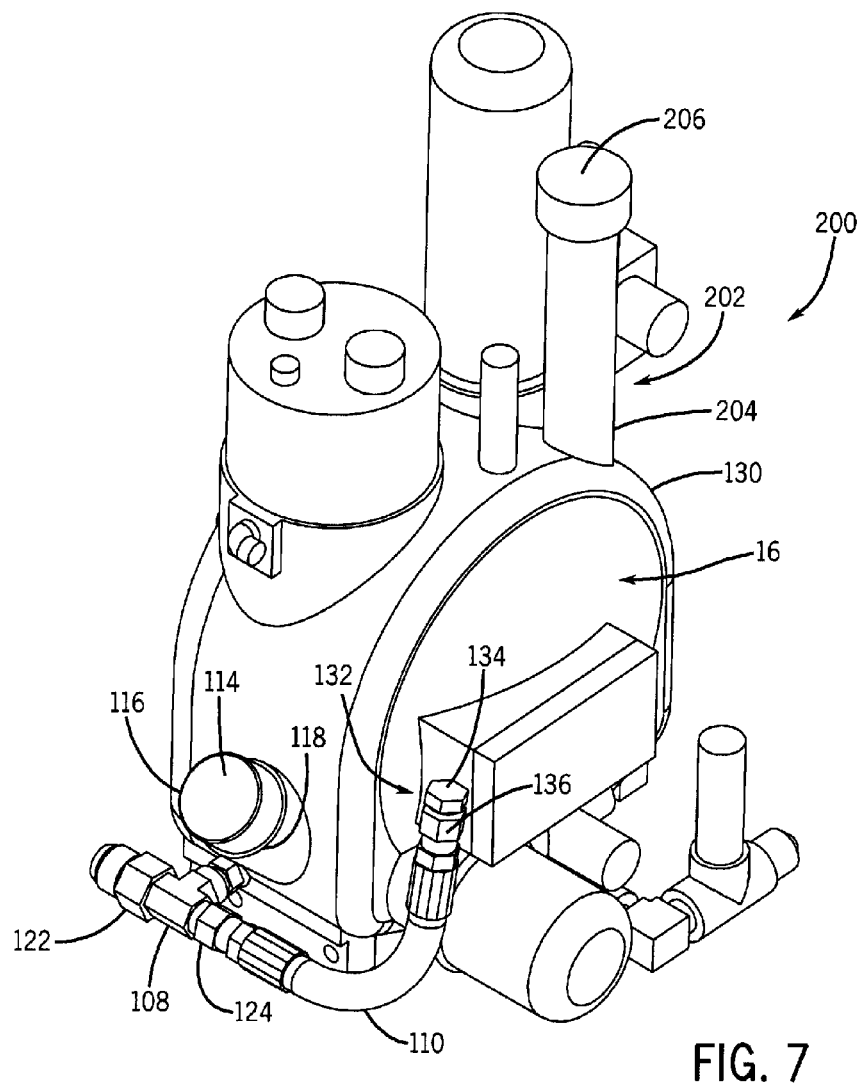

FIG. 5 is a side view of an embodiment of the oil fill assembly coupled to the compressor as illustrated in FIG. 4; and FIG. 6 is a cross-sectional view of an embodiment of the oil fill assembly coupled to the compressor as illustrated in FIG. 5; and FIG. 7 is a perspective view of an alternative embodiment of an oil fill assembly coupled to an air compressor of the welding generator/compressor system as illustrated in FIGS. 1-3.

DETAILED DESCRIPTION

Referring now to the drawings, FIGS. 1-3 illustrate an engine-driven welding generator/compressor system 10 having an engine 12 drivingly coupled to a welding generator 14 and an air compressor 16 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via an electric clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10. The system 10 also may include a battery and/or a battery charge system, which may include features to monitor conditions of the battery (e.g., internal or external to the system 10) and to adjust the characteristics of the charge (e.g., variable output level, duration, etc.).

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof, to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16

As described below, the power from the engine 12 operates both the generator 14 and the air compressor 16 via a first shaft 20 and a second shaft 22 (e.g., stub shaft), respectively. In some embodiments, these shafts 20 and 22 may be independent from one another, while in other embodiments shafts 20 and 22 may be part of a single shaft extending through the engine 12. As illustrated, the shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second stub shaft 22 couples indirectly to the compressor 16. However, either arrangement can be used for the connection between the engine 12 and the generator 14 and/or the compressor 16.

For example, as will be discussed in greater detail below, the engine 12 is coupled to the compressor 16 via a belt and pulley system including the stub shaft 22, a pulley 24 coupled to the shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the stub shaft 22 to transmit rotation and torque via the pulleys 24 and 28, drive belt 30, and clutch to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

The engine 12 includes a power source configured to provide power to the generator 14 and the air compressor 16. In an embodiment, the engine 12 may include a combustion engine powered by gas, diesel, LP fuel, natural gas, or other fuel and driving one or more drive shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine. For example, a 64 Hp engine may weigh approximately 1900 lbs., whereas a similar 24 Hp engine may weigh less than approximately 1000 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to an electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the rotating drive shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. As suggested above, multiple generators 14 may be connected to the drive shaft 20 or stub shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, spray guns, saws, nail guns, screw drivers, drills, lifts, and chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 12. For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features. Other panels of the enclosure 18 may also include access panels. For example, an oil filter access panel 41 may be included on the rear of the enclosure 18, allowing access to the oil filter of the compressor 16 and/or use of an oil drain tube.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a rotatable dial to select a mode of operation, such as a DC weld, an AC weld, a battery charge, or an air tool operation. The control panel 34 may also include various indicators 42 to provide feedback to the user. For example, the indicator 42 may include an LCD to display voltage, amperage, air pressure, and the like. Embodiments of the control panel 34 include any number inputs and outputs, such as welding methods, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. In an embodiment these outputs 46, 48 and 50 are coupled to various devices and tools. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. For example an air tool 64 may be coupled to the compressed air output 50 via an air hose 66. The air hose 66 may exit the system 10 at various other locations; including the back of the system 10 proximate to the air compressor 16. The air tool 64 may include various pneumatic tools and the like. In some embodiments, a plasma cutting torch 54 may receive both AC power and compressed air from the system 10. In another embodiment, the plasma cutting torch 54 may receive power from an external unit (e.g., wall outlet AC power) while receiving compressed air from the air compressor 16 of the system 10.

As discussed previously, the system 10 may include multiple components working in cooperation to generate power, compressed air, and other outputs. For example, in the illustrated embodiment, a single engine 12 is coupled to the generator 14 and the air compressor 16. As will be appreciated, mechanical design of such a system 10 may entail various arrangements of components to provide an efficient and reliable system 10. For instance, if the components are not positioned correctly with respect to one another, then the misalignment may cause premature wear and/or failure of the system 10 and its components. For example, misalignment of the stub shaft 22 may reduce the efficiency of the system and create additional wear on bearings within the air compressor 16 or the engine 12. Further, each of the components may have a tendency to vibrate and, thus, increase the wear potential on surrounding components. Such a vibration may also reduce the appeal to operators, as the system 10 may not run as quietly and smoothly as desired. As discussed in further detail below, various features of the system 10 are configured to align and isolate components, including the engine 12 and the air compressor 16.

FIG. 4 depicts a perspective view of a compressor maintenance system 100 having the oil fill assembly 31 coupled to the air compressor 16 in accordance with an embodiment of the present invention. The oil fill assembly 31 includes a tube 102, a top piece 104, and a cap 106. Advantageously, the oil fill assembly 31 extends, relocates, retrofits, or generally makes remote the oil fill location, such that a user can easily access, check, and fill oil into the compressor 16 without any unnecessary searching, disassembly of the system, or reaching down into the system 10. In the illustrated embodiment, the tube 102 acts as an extension to route the top piece 104 with the cap 106 to a top location within the system 10, as illustrated in FIG. 1. Again, without this oil fill assembly 31, the user would likely need to reach deep within the system 10, remove additional panels, e.g., side panels, remove other parts blocking access, and so forth. Thus, the compressor 16 could not readily be serviced for an oil check, change, or fill. As a result, a typical user may not routinely check the oil level, add oil when needed, or change oil when suitable, which could lead to premature wear, overheating, and damage to the compressor 16. Again, the oil fill assembly 31 is a significant improvement for servicing, maintenance, and overall performance of the compressor 16. The performance and life of the compressor 16 could be drastically impaired with an inaccessible oil fill assembly.

In the illustrated embodiment, the oil fill assembly 31 includes a T-fitting 108 and an oil drain tube 110. The oil drain tube 110 may be used to drain oil from the compressor 16 without completely removing the oil fill assembly 31. The oil fill assembly 31 also includes a vent hose 112. For example, the vent hose 112 may be configured to vent trapped air within the compressor 16 while adding or draining oil. The vent hose 112 is particularly useful for speeding up the oil filling or draining process, while also improving the accuracy of measurements taken regarding the amount of oil in the compressor 16. Given that trapped air can detrimentally affect readings of the oil level, the vent hose 112 is particularly useful and advantageous over existing oil fill assemblies.

The air compressor 16 also includes a base oil fill location 114, which includes a cap 116 threaded onto a base oil fill receptacle 118. As appreciated, the base location 114 may be difficult or impossible for a user to locate, much less access and add oil via the cap 116. In the system 10 as illustrated in FIG. 1, the fill location 114 may be buried deep within the enclosure 18, surrounded by other components, and not easily accessible by a user. In fact, a user may need to remove components in the vicinity of the fill location 114, which can cause significant delays and can deter a user from making regular service checks and oil fills. Again, the oil fill assembly 31 places the top piece 104 and the cap 106 toward the top of the compressor 16, such that a user does not need to search or perform any time consuming tasks to check and fill the oil.

Thus, the oil fill assembly 31 is configured to retrofit an existing compressor 16 having the base oil fill location 114, such that the location is more accessible to a user for servicing, maintenance, and so forth.

In some embodiments, the top piece 104 may extend into the control panel 34, the first hatch 38, or to another external portion of the enclosure 18, such that a user can check and fill the oil without even opening the system 10. Similarly, the drain tube 110 may extend to the control panel 34, oil filter access panel 41, or to another external portion of the enclosure 18, such that a user can drain the oil without even opening the system 10. The oil fill assembly 31 may be made entirely or substantially from metal or a suitable corrosion resistant material, which can also withstand the pressures generated by the compressor 16. In addition, the metal or other material may be selected with properties to withstand the vibrations and heat generated by the compressor 16, the engine 12, and other components in the welding system 10. In some embodiments, the oil fill assembly 31 may include a viewing window, such that a user can visually inspect an oil level within the compressor 16. For example, again, an oil level inspection window may be disposed on the control panel 34, the first hatch 38, or another external portion of the enclosure 18. In other embodiments, a viewing window may be included on the crankcase of the compressor 16.

The tube 102, the top piece 104, the T-fitting 108, and the drain tube 110 are connected together through one or more fittings 120, 122, and 124. The fittings 120, 122, and 124 may be quick-disconnect fittings (e.g., push-to-connect fittings), threaded fittings, or any other type of fitting and/or connectors that can withstand the pressures generated by the compressor 16 and resist corrosion. The oil fill assembly 31 is connected to a base 126 of the compressor 16 through the T-fitting 108. In one embodiment, the T-fitting 108 may couple to an existing oil drain 128 (or another suitable receptacle) at the base 126 of the compressor 16. In other embodiments, a hole or other attachment point 128 may be added to the compressor 16 by modifying the crankcase 130 of the compressor 16, or the oil fill assembly 31 may be coupled to the preexisting oil fill location 114. One side of the T-fitting 108 connects to the tube 102, and the other side connects to the oil drain tube 110.

In one embodiment, the oil drain tube 110 may be a curved tube, which extends upwardly to a raised position 132 with a plug 134 threaded into a receptacle 136. This raised position 132 may improve user access and serviceability, for example, by enabling a user to quickly connect a drainage pump to the receptacle 136 to withdraw the oil within the compressor 16. Alternatively, another drainage hose may be quickly connected to the receptacle 136, and pressure may be applied through the top piece 104 to force the oil out of the compressor 16. In another embodiment, the oil drain tube 110 may a flexible hose, and may extend or be pulled through oil filter access panel 41 to drain the oil within the compressor 16. In other embodiments, the oil drain tube 110 may be straight or may be omitted entirely, and the T-fitting 108 may be capped at that end. The T-fitting 108 may be coupled to the compressor 16 and the components of the oil fill assembly 31 through push-to-connect fittings, threaded fittings, or any other type of fitting and/or connector that can withstand the pressures generated by the compressor 16 and resist corrosion.

The tube 102 connects the T-fitting 108 to the top piece 104 and provides the height desirable to relocate the oil fill to a more accessible location. The pre-existing oil fill location 114 is located near the base 126 of the compressor 16 and is difficult to access when the compressor 16 is included as a part of the welding system 10. For example, the welding system 10 may be stored or used in a confined location, such as the back of a truck. The oil fill assembly 31 and tube 102 are of sufficient length to relocate the oil fill, so that it is accessible from the top of the welding system 10 when the free space around the welding system 10 is limited. Therefore, the length of tube 102 may vary according to the size of the compressor 16, the size of the enclosure 18 of the welding system 10, and the attachment point of the oil assembly 31. As explained below, the tube 102 also contains a dipstick that may be used to check the oil level in the compressor 16. Similar to the T-fitting 108, the tube 102 may connect to the other components of the oil fill assembly 31 through push-to-connect fittings, threaded fittings, or any other type of fitting and/or connector that can withstand the pressures generated by the compressor 16 and resist corrosion.

The top piece 104 and cap 106 provide the oil fill point for the oil fill assembly 31. The cap 106 may be designed to be a tool-less cap, e.g., a knurled cap, so that removal and replacement of the cap 106 may be performed by an operator without the use of tools. Alternatively, in some embodiments, the cap 106 may be of a locking design and may involve unlocking before removal. Removal of the cap 106 exposes a fill point at the top piece 104 through which oil may be added to the compressor 16. The top piece 104 and cap 106 may be of a threaded design such that the cap 106 can be screwed on or off of the top piece 104. In some embodiments, the cap 106 may have a hole or slot in the threads to release pressure from the crankcase 130 of the compressor 16 before the threads of the cap 106 become fully disengaged during removal. Additionally, in one embodiment, the cap 106 may be attached to a dipstick that may be used to measure the oil level in the compressor. In some embodiments, the dipstick may be a separate piece not coupled to the cap 106, and may involve separate removal after the cap 106 has been removed. The cap 106 may also include an o-ring seal or other seal to seal and prevent pressure or oil from escaping between the top piece 104 and the cap 106 when the compressor 16 is in operation.

Turning now to FIG. 5, a side view of the compressor 16 and oil assembly 31 is shown in accordance with an embodiment of the present invention. As is more clearly shown in FIG. 5, the vent hose 112 is coupled to the top piece 104 and to the compressor crankcase 130. The vent hose 112 is connected to the compressor crankcase 130 through a fitting 138. In one embodiment, the fitting 138 is threaded onto the top of the crankcase 130 of the compressor 16. In other embodiments, however, the fitting 138 may be a part of the crankcase 130 of the compressor 16, or may be welded or otherwise attached to the crankcase 130. The vent hose 112 may connect to the fitting 138 and the top piece 104 through push-to-connect fittings, threaded fittings, or any other type of fitting and/or connector that can withstand the necessary pressures and resist oil corrosion.

The vent hose 112 enables air trapped in the crankcase 130 to be vented while an operator is checking the level of the oil in the compressor 16 or adding oil to the compressor 16. When adding or filling oil into the compressor 16, air trapped in the crankcase 130 can vent to atmosphere through the vent hose 112 and out of the top piece 104, thus preventing false oil level readings and/or erratic oil filling that may be caused by a buildup of air in the system. The pressure is then equalized at both ends of the oil fill assembly 31. In one embodiment, the vent hose 112 is made from clear, hard plastic tubing, but any tubing that can withstand the pressures generated by the compressor 16 may be used.

FIG. 6 depicts a cross-section of the oil fill assembly 31 taken along line 6-6 of FIG. 5 in accordance with an embodiment of the present invention. As can be more clearly seen in FIG. 6, a dipstick 140 is coupled to the cap 106 of the oil fill assembly 31. The dipstick 140 may extend through the top piece 104 and down the tube 102 at a sufficient length to measure the level of oil in the compressor 16. Additionally, the dipstick 140 may have graduations or marking based on the oil capacity of the compressor 16 and indicating various oil levels such as "FULL," "EMPTY," or any other oil level. For example, when enough oil is contained in the compressor 16 such that the oil capacity of the compressor 16 is met, the dipstick 140 should extend into the oil and indicate a "FULL" reading. If the oil in the compressor 16 is below the necessary oil capacity of the compressor 16, the dipstick 140 may indicate a reading somewhere between the "FULL" and "EMPTY" markings.

Operation of the oil assembly 31 in accordance with the embodiment of the invention depicted in FIGS. 1-6 will now be described. When an operator desires to check the oil level of the compressor 16, such as for maintenance or to add oil after draining the oil through oil drain 110, the operator accesses the oil assembly 31 by opening the access hatch 38 covering the compressor 16 at the end of the enclosure 18, as illustrated in FIG. 1. For example, the access hatch 38 may be a "flip-top" design as shown in FIG. 1, enabling the operator to flip open the access hatch 38 without removing the access hatch entirely. Alternatively, in some embodiments the access hatch 38 may be completely removable. After the access hatch 38 is removed or rotated to an open position, then the operator may access the oil fill assembly 31 and may remove the cap 106.

As discussed above, the cap 106 may be of a tool-less design and an operator may remove the cap 106 without tools. In addition, the cap 106 may include warning labels or other text and/or markings indicating the conditions when the cap 106 should or should not be removed. For example, the warning may indicate that the cap 106 should not be removed when the compressor 16 is running. Alternatively, as discussed above, the cap 106 may be of a locking design that prevents opening unless the operator unlocks the cap 106.

During maintenance or service, the operator may remove the cap 106 and dipstick 140 assembly. Alternatively, the cap 106 and dipstick 140 may be separate components and the dipstick may require removal after removal of the cap 106. After removing the cap 106 and dipstick 140, the operator may read the dipstick 140 to check the oil level in the compressor 16. According to the oil level indicated on the dipstick 140, the operator may choose to add more oil to the compressor 16 through the top piece 104 of the oil assembly 31. After adding oil, the operator may again insert the cap 106 and dipstick 31 to obtain another reading of the oil level in the compressor 16. As discussed above, the vent hose 112 enables air to vent from the crank case 130 as oil is added to the compressor 16, so the dipstick 140 should more accurately reflect the level of oil in the compressor 16. After sufficient oil has been added to the compressor 16, the cap 106 and dipstick 140 may be replaced on the oil fill assembly 31.

FIG. 7 depicts a perspective view of an alternative compressor maintenance system 200 having an oil fill assembly 202 coupled to the air compressor 16 in accordance with an embodiment of the present invention. The oil fill assembly 202 includes a tube 204 and a cap 206. Similarly to the other embodiments, the oil fill assembly 202 extends, relocates, retrofits, or generally makes remote the oil fill location, such that a user can easily access, check, and fill oil into the compressor 16 without any unnecessary searching, disassembly of the system, or reaching down into the system 10. In the illustrated embodiment, the tube 204 acts as an extension to a top location within the system 10, as illustrated in FIG. 1. Again, without this oil fill assembly 202, the user would likely need to reach deep within the system 10, remove additional panels, e.g., side panels, remove other parts blocking access, and so forth. Thus, the compressor 16 could not readily be serviced for an oil check, change, or fill. As a result, a typical user may not routinely check the oil level, add oil when needed, or change oil when suitable, which could lead to premature wear, overheating, and damage to the compressor 16. Again, as discussed above, the oil fill assembly 202 is a significant improvement for servicing, maintenance, and overall performance of the compressor 16. The performance and life of the compressor 16 could be drastically impaired with an inaccessible oil fill assembly.

The tube 204 may be coupled to the crankcase 130 through a hole machined in the crankcase casting. The tube 204 may be made substantially or entirely from metal, such as steel, or a suitable corrosion resistant material, which can also withstand the pressures generated by the compressor 16. The base of the tube 204 may be threaded to allow coupling to the crankcase 130 through a machined hole. Alternatively, the tube 204 may be welded or otherwise attached to the crankcase 130. Advantageously, the oil fill assembly 202 does not require a vent tube or other pressure vent from the crankcase 130 of the compressor 16. The tube 204 may have a diameter and cross-sectional area of sufficient size to vent pressure from the crankcase 130. For example, as oil is added into the tube 204, pressure may vent from the crankcase 130 up through the tube 204 as oil is added, thereby eliminating the need for a separate pressure vent. Additionally, the oil fill assembly 202 may require less material for manufacture and require less fittings than other embodiments, such as oil fill assembly 31.

The cap 206 may be designed to be a tool-less cap, e.g., a knurled cap, so that removal and replacement of the cap 206 may be performed by an operator without the use of tools. Alternatively, in some embodiments, the cap 206 may be of a locking design and may involve unlocking before removal. Removal of the cap 206 exposes a fill point at the tube 204 through which oil may be added to the compressor 16. The top of the tube 204 and cap 206 may be of a threaded design such that the cap 206 can be screwed on or off of the top of the tube 204. In some embodiments, the cap 206 may have a hole or slot in the threads to release pressure from the crankcase 130 of the compressor 16 before the threads of the cap 206 become fully disengaged during removal. Additionally, in one embodiment, the cap 206 may be attached to a dipstick, forming a cap and dipstick assembly that may be used to measure the oil level in the compressor. In some embodiments, the dipstick may be a separate piece not coupled to the cap 206, and may involve separate removal after the cap 206 has been removed. The cap 206 may also include an o-ring seal or other seal to seal and prevent pressure or oil from escaping between the top piece 204 and the cap 206 when the compressor 16 is in operation. In addition, the cap 206 may include warning labels or other text and/or markings indicating the conditions when the cap 206 should or should not be removed. For example, the warning may indicate that the cap 206 should not be removed when the compressor 16 is running.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an engine configured to provide output power;
a welding generator coupled to the engine, wherein the output power from the engine is configured to drive the welding generator;
a compressor coupled to the engine, wherein the output power from the engine is configured to drive the compressor, the compressor comprises an interior oil chamber within a case of the compressor, and the compressor is configured to output compressed air at a compressed air output when driven by the engine;
an enclosure surrounding the engine, the welding generator, and the compressor; and
an oil fill assembly coupled directly to the compressor, wherein the oil fill assembly relocates an oil fill location from a bottom region of the compressor to a top region of the compressor, the bottom region of the compressor comprises a first oil fill receptacle into the interior oil chamber of the compressor, the top region of the compressor comprises a second oil fill receptacle provided by the oil fill assembly, the oil fill assembly comprises at least one tube extending outside the case of the compressor from a connection with the case at the bottom region to the second oil fill receptacle at the top region, and the second oil fill receptacle is configured to enable an operator to add oil to the interior oil chamber through the at least one tube, wherein the second oil fill receptacle is disposed within the enclosure and is accessible by a panel of the enclosure positioned vertically over the compressor, or the second oil fill receptacle extends through an opening in the enclosure.

2. The system of claim 1, wherein the compressor comprises a rotary screw compressor.

3. The system of claim 1, wherein the connection comprises an oil drain of the compressor, the at least one tube comprises a first tube coupled to the oil drain of the compressor, and the oil drain is separate from the first and second oil fill receptacles.

4. The system of claim 1, wherein the connection comprises the first oil fill receptacle, and the at least one tube is coupled to the first oil fill receptacle of the compressor.

5. The system of claim 1, wherein the second oil fill receptacle is disposed adjacent an access panel of the enclosure.

6. The system of claim 1, comprising a control panel coupled to the welding generator, the engine, and the compressor, wherein the control panel includes a welding control feature and an air compressor control feature.

7. The system of claim 1, wherein the welding generator comprises a first section configured to provide a welding current to a welder and a second section configured to provide a current to an alternating current (AC) output.

8. The system of claim 3, wherein the oil fill assembly comprises a second tube coupled to the case of the compressor, and the second tube is configured to vent the case.

9. A system, comprising:
a compressor retrofit kit, comprising:
a first tube configured to couple with a drain or an existing oil fill disposed in a base region of a compressor of an air pack welding system configured to output compressed air and welding power;
a second tube coupled to the first tube, wherein the second tube is configured to couple with a vent in the compressor; and
a relocated oil fill section coupled to the first tube, the second tube, or a combination thereof, wherein the relocated oil fill section is configured to enable an operator to add oil to the compressor through the first tube;

wherein the first tube, the second tube, and the relocated oil fill section do not couple with a compressed air output of the compressor, wherein the first tube is configured to extend outside a case of the compressor from a connection with the case at the base region to the relocated oil fill section at a top region of the compressor, and wherein the relocated oil fill section is configured to be accessed through a panel of an enclosure positioned vertically over the relocated oil fill section, or the relocated oil fill section is configured to extend vertically through an opening in the enclosure, and wherein the enclosure is configured to surround the compressor.

10. The system of claim 9, comprising a third tube coupled to the first tube, wherein the third tube comprises a relocated oil fill drain, and the relocated oil fill drain is configured to enable the operator to drain oil from the compressor through the third tube.

11. The system of claim 9, wherein the first tube extends at least substantially the height of the compressor.

12. The system of claim 9, wherein the compressor retrofit kit is configured to position the relocated oil fill section adjacent an access panel of an enclosure of the air pack welding system.

13. The system of claim 9, comprising the compressor coupled to the compressor retrofit kit.

14. The system of claim 13, wherein the compressor comprises a rotary screw compressor.

15. The system of claim 13, comprising the air pack welding system having an engine coupled to the compressor, a welding generator coupled to the engine, and a single enclosure surrounding the engine, the welding generator, and the compressor, wherein the engine is configured to drive the compressor and the welding generator.

16. A system, comprising:
a portable unit, comprising:
an enclosure having a top access panel;
an engine disposed within the enclosure, wherein the engine is configured to provide output power;
a compressor disposed within the enclosure, wherein the output power from the engine is configured to drive the compressor, the compressor comprises an interior oil chamber within a case of the compressor, the compressor is configured to output compressed air at a compressed air output when driven by the engine, the compressor comprises an oil drain and an oil fill into the interior oil chamber of the compressor, and the oil drain and the oil fill are disposed in a bottom region of the compressor;
a first tube comprising a first end coupled to the oil drain and a second end disposed near the top access panel, wherein the second end comprises a relocated oil fill, the first tube extends outside the case of the compressor from the oil drain of the case at the bottom region to the second end disposed near the top access panel, and the relocated oil fill is configured to enable an operator to add oil to the interior oil chamber through the first tube by accessing the second end of the first tube vertically through the top access panel;
a compressor vent tube coupled to the first tube; and
a second tube comprising a first end coupled to the oil drain and a second end disposed near the bottom region of the compressor, wherein the second end comprises a relocated oil drain.

17. The system of claim 16, wherein the portable unit comprises a welding generator, wherein the output power from the engine is configured to drive the welding generator.

18. The system of claim 16, wherein the compressor comprises a rotary screw compressor.

19. A system, comprising:
a compressor retrofit kit, comprising:
a tube configured to couple directly to a case of a compressor of an air pack welding system configured to output compressed air at a compressed air output and welding power at a welding power output, wherein the tube allows pressure to vent from an interior of the case of the compressor, the tube relocates an oil fill location from a bottom region of the compressor to a relocated oil fill location at a top region of the compressor, the relocated oil fill location is configured to enable an operator to add oil to the compressor through the tube, the tube does not couple with the compressed air output of the compressor, and the tube is configured to extend outside the case of the compressor from a connection with the case at the bottom region to the relocated oil fill location at the top region, wherein the relocated oil fill location is configured to be accessed through a panel of an enclosure positioned vertically over the relocated oil fill location, or the relocated oil fill location is configured to extend vertically through an opening in the enclosure, and wherein the enclosure is configured to surround the compressor.

20. The system of claim 19, comprising a cap and dipstick assembly configured to couple to the tube.

21. The system of claim 19, wherein the tube extends at least substantially the height of the case of the compressor.

22. The system of claim 19, wherein the compressor retrofit kit is configured to position the relocated oil fill location adjacent an access panel of an enclosure of the air pack welding system.

23. The system of claim 19, wherein the air pack welding system comprises an engine coupled to the compressor, a welding generator coupled to the engine, and a single enclosure surrounding the engine, the welding generator, and the compressor, wherein the engine is configured to drive the compressor and the welding generator.

24. The system of claim 19, comprising the compressor coupled to the compressor retrofit kit.

25. The system of claim 24, wherein the compressor comprises a rotary screw compressor.

* * * * *